United States Patent
Lee

(10) Patent No.: US 8,489,328 B2
(45) Date of Patent: Jul. 16, 2013

(54) APPARATUS AND METHOD FOR AUTOMATICALLY DETECTING MOVEMENT PATHS

(75) Inventor: Kyung Woo Lee, Osan-si (KR)

(73) Assignee: LG Electronics Inc., Seoul (KR)

( * ) Notice: Subject to any disclaimer, the term of this patent is extended or adjusted under 35 U.S.C. 154(b) by 861 days.

(21) Appl. No.: 11/445,160

(22) Filed: Jun. 2, 2006

(65) Prior Publication Data

US 2006/0284739 A1  Dec. 21, 2006

(30) Foreign Application Priority Data

Jun. 3, 2005 (KR) .................. 10-2005-0047622

(51) Int. Cl.
*G01C 21/00* (2006.01)
*G01C 21/30* (2006.01)
*G01C 21/32* (2006.01)

(52) U.S. Cl.
USPC ........... 701/459; 701/410; 701/411; 701/412; 701/455; 701/460

(58) Field of Classification Search
USPC .......... 701/208, 209, 210, 211, 213; 340/988, 340/990, 995.1, 995.11, 995.14, 995.15, 340/995.24
See application file for complete search history.

(56) References Cited

U.S. PATENT DOCUMENTS

| | | | |
|---|---|---|---|
| 4,992,947 A * | 2/1991 | Nimura et al. | 701/210 |
| 5,731,979 A * | 3/1998 | Yano et al. | 701/211 |
| 5,982,301 A * | 11/1999 | Ohta et al. | 340/995.2 |
| 6,067,502 A | 5/2000 | Hayashida et al. | |
| 6,574,554 B1 * | 6/2003 | Beesley et al. | 701/209 |
| 7,321,824 B1 * | 1/2008 | Nesbitt | 701/426 |
| 2004/0102898 A1 * | 5/2004 | Yokota et al. | 701/210 |
| 2004/0259545 A1 * | 12/2004 | Morita | 455/435.1 |
| 2004/0267440 A1 * | 12/2004 | DeKock et al. | 701/117 |
| 2005/0033506 A1 * | 2/2005 | Peterson | 701/117 |
| 2006/0074546 A1 * | 4/2006 | DeKock et al. | 701/117 |
| 2006/0143959 A1 * | 7/2006 | Stehle et al. | 40/600 |
| 2008/0043692 A1 * | 2/2008 | Morita | 370/338 |
| 2008/0068222 A1 * | 3/2008 | MacLeod | 340/995.13 |
| 2008/0198043 A1 * | 8/2008 | Adachi | 340/995.12 |

FOREIGN PATENT DOCUMENTS

| | | |
|---|---|---|
| EP | 1 288 628 A2 | 3/2003 |
| JP | 7-270172 A | 10/1995 |

* cited by examiner

*Primary Examiner* — Khoi Tran
*Assistant Examiner* — Bao Long T Nguyen
(74) *Attorney, Agent, or Firm* — Birch, Stewart, Kolasch & Birch, LLP

(57) ABSTRACT

A method of generating maps, which includes generating a first map corresponding to a first code, and generating a second map including a starting point and an ending point including a plurality of second codes representing links from the starting point to the ending point. Further, when one of the links is selected, a detailed map of the selected link is displayed.

16 Claims, 5 Drawing Sheets

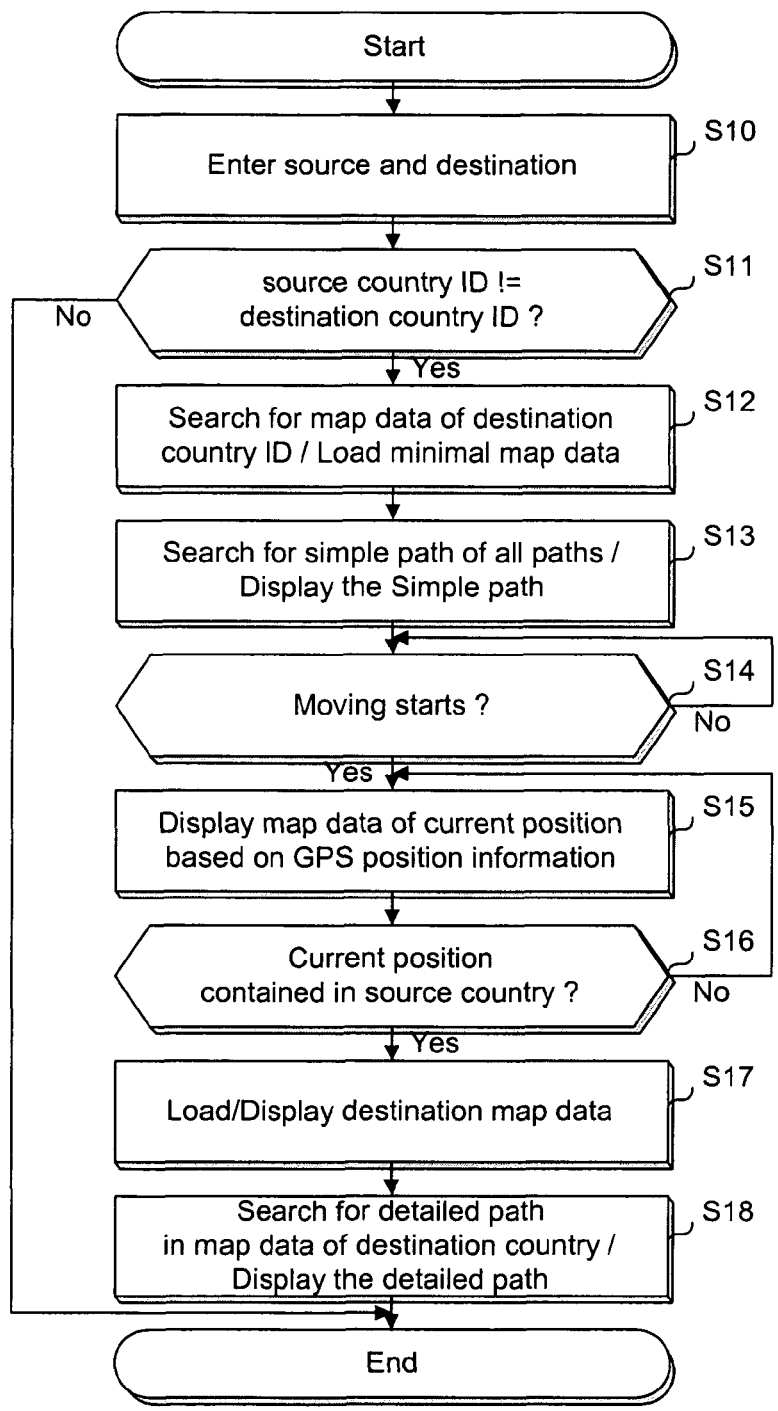

Detailed map of DC

APPARATUS AND METHOD FOR AUTOMATICALLY DETECTING MOVEMENT PATHS

This application claims priority to Korean Application No. 10-2005-0547622 filed in Korea on Jun. 3, 2005, the entire contents of which is incorporated by reference in its entirety.

BACKGROUND OF THE INVENTION

1. Field of the Invention

The present invention relates to a method and apparatus for searching for a moving path between regions, and more particularly to a method and apparatus for changing a map of a first region to a map of a second region using only one setup process when a vehicle equipped with a navigation device moves from the first region to the second region, and displaying vehicle position information about the map of the second region. The present invention also relates to a method and apparatus for generating a map including a plurality of links between start and end points and allowing the user to select one of the links to display a detailed map about the region corresponding to the selected link.

2. Description of the Related Art

Typically, a vehicle navigation device detects a current position of a vehicle and displays a variety of information including the detected vehicle position, a road map associated with the vehicle position, an area name associated with the road map, and other information (e.g., information about lodging, gas stations, amusement parks, etc.) on a display contained in the vehicle. In addition, the vehicle navigation device displays character and number information, an area name, and other information corresponding to the road map as a single screen image on the display.

Further, economical- and political-integration of many countries in the Europe Union (EU) has occurred, such that people frequently drive their vehicles from one country to another country in Europe. Therefore, if a vehicle driver moves from a first country to a second country, the vehicle driver must manually replace a current CD-ROM or external memory including map data of the first country with another CD-ROM or external memory including map data of the second country indicating a destination, and must re-establish a source and a destination on the second country map, which inconveniences the user. Similar comments apply to driving between states, regions, etc.

SUMMARY OF THE INVENTION

Accordingly, one object of the present invention is to address the above-noted and other problems.

Another object of the present invention is to provide a method and apparatus for efficiently changing maps between countries, states, etc. using only one setup process, such that the user can view a moving path between countries, states, regions, etc.

Yet another object of the present invention is to provide a method and apparatus that allows a user to view regions or links between a source and destination point and then select one of the regions or links to view that particular region or link in greater detail, thereby determining if traffic congestion, for example, is occurring in the selected region or link.

To achieve these and other advantages and in accordance with the purpose of the present invention, as embodied and broadly described herein, the present invention provides a novel method of generating maps, which includes generating a first map corresponding to a first code, and generating a second map including a starting point and an ending point including a plurality of second codes representing links from the starting point to the ending point. The present invention also provides a corresponding navigation apparatus.

According to another aspect, the present invention provides a method for generating maps, which includes generating a first map of a first country, and generating a second map including a location in the first country to a location in a second country. The present invention also provides a corresponding navigation apparatus.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The above and other objects, features and other advantages of the present invention will be more clearly understood from the following detailed description taken in conjunction with the accompanying drawings, wherein:

FIG. 3 is a flow chart illustrating a method for searching for a moving path between countries in accordance with an embodiment of the present invention;

DETAILED DESCRIPTION OF PREFERRED EMBODIMENTS

A method for searching for a moving path between countries according to an embodiment of the present invention combines country codes (country IDs) to map data of individual countries, automatically searches for the country IDs, detects a current vehicle position, loads map data of a country associated with the detected current position, performs a process for searching for a moving path between countries in multi-stages (e.g., from a simple-path search process to a detailed-path search process), and at the same time displays a moving path for each stage.

Thus, the apparatus for searching for a moving path between countries in accordance with the present invention stores map data of individual countries associated with country IDs using a map data storage unit, and detects current vehicle position information denoted by latitude and longitude information received from a Global Positioning System (GPS) satellite at intervals of a predetermined time. Further, a main controller reads a country code (ID_2) corresponding to the detected current position. If the read country code is different from a country code (ID_1) of currently-displayed map data, the main controller automatically uploads map data of the country code (ID_2) corresponding to the current vehicle position information, and displays the uploaded map data.

Figure 1:
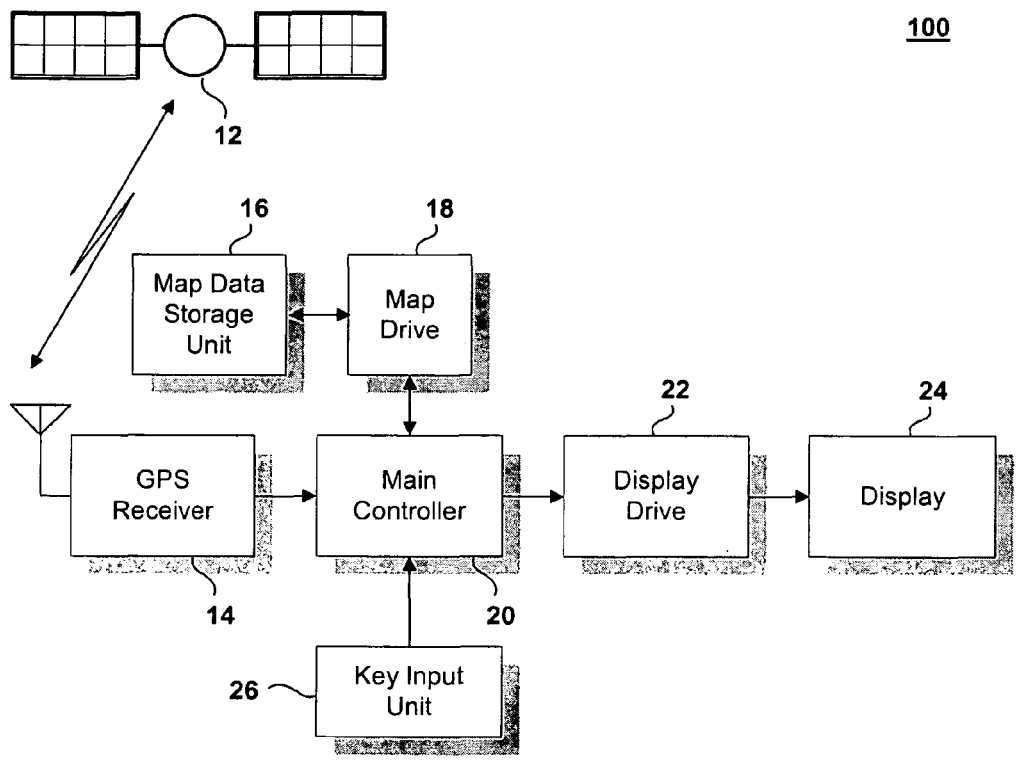
FIG. 1 is a block diagram illustrating a vehicle navigation device in accordance with an embodiment of the present invention.

For example, FIG. 1 is a block diagram illustrating a vehicle navigation device in accordance with an embodiment of the present invention. Referring to FIG. 1, the navigation device 100 simultaneously receives satellite signals from at least three GPS satellites 12, and calculates an optimum path from a vehicle's current position to a desired destination using a GPS receiver 14 that calculates longitude and latitude information of a specific place. The navigation device 100 also combines the vehicle's current position with road map information extracted from a map data storage unit 16 storing road map data, and uses a display drive 22 to display on a display 24 a corresponding map to the vehicle driver including the vehicle's current position, traveling direction and other information. The display 24 is implemented with a Liquid Crystal Display (LCD), etc., and includes a toggle button 25 to toggle between displayed maps.

Figure 2:
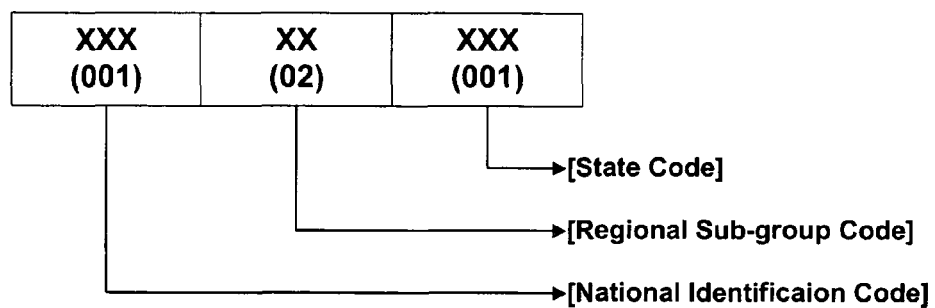
FIG. 2 is an overview illustrating country codes contained in map data of individual countries in accordance with an embodiment of the present invention.

In addition, FIG. 2 shows country codes (country IDs) contained in map data of individual countries in accordance with an embodiment of the present invention. Referring to FIG. 2, the country ID includes a National Identification (ID) Code, a Regional Sub-group Code, and a State Code. The country ID may also include a Reserved Code (not shown).

Further, in association with the national ID code, for example, the Republic of Korea can be assigned a predetermined number of "081," and the United States of America can be assigned a predetermined number of "001." In association with the regional sub-group code, for example, the West Coast of the USA (USA-WestCoast) can be assigned a predetermined number of "01," the central portion of the USA (USA-Central) can be assigned a predetermined number of "02," and the Southern portion of the USA (USA-Southern) can be assigned a predetermined number of "03." In association with the State code, for example, New York (USA-New York) can be assigned a predetermined number of "01," and Washington, D.C. (USA-Washington) can be assigned a predetermined number of "02."

Turning now to FIG. 3, which is a flow chart illustrating a method for searching for a moving path between countries in accordance with an embodiment of the present invention. The elements shown in FIG. 1 will also be referred to in this description. Referring to FIG. 3, a vehicle driver enters a source including a country ID and a destination including another country ID at step S10. For example, the vehicle driver enters Paris France assigned the predetermined number "005-01" as a source, and enters Berlin Germany assigned the predetermined number "007-01" as a destination at step S10. In more detail, the navigation device 100 displays a plurality of country IDs for the vehicle driver, and allows the user to freely select a specific key corresponding to a desired source and destination country. When the user selects a predetermined country ID from among many country IDs, the navigation device displays a plurality of sub-region codes contained in the selected country ID. Thus, the user can select one of the displayed sub-region codes.

Further, the country ID and the sub-region code of the source may be automatically determined by current vehicle position information detected by the GPS system 12, for example. That is, the main controller 20 determines what country the current vehicle position is in based on the GPS information by searching individual country map data stored in the map data storage unit 16, and outputs a country ID corresponding to the current vehicle position. Alternatively, the user may select an origination point from displayed values that is different than where the vehicle is currently located.

When the destination country ID is entered by the user, the main controller 20 compares the destination country ID with the source country ID, and determines whether the destination country ID is different from the source country ID (step S11). If the destination country ID is different from the source country ID (Yes in step S11), the main controller 20 searches for map data corresponding to the destination country ID from the map data storage unit 16, and loads the destination map data (e.g., a high-scale or high-level map data) required for a simple-path search process from among searched country map data (step S12). In this instance, the main controller 20 displays the loaded map on the display 24, such that the user can enter a sub-region code associated with a destination using a touch-screen of the display.

In more detail, if the user touches a predetermined point on the displayed destination country map, a touch-screen included with the display 24 outputs X and Y coordinates of the user-touched point. Further, the main controller 20 maps the X and Y coordinates to the currently-displayed map, calculates latitude and longitude information of the touched point, and selects a regional code corresponding to the calculated latitude and longitude information. Then, the main controller 20 displays either information associated with a specific region corresponding to the calculated latitude and longitude or city information associated with a specific city closest to the calculated latitude and longitude on the display 24, and enables the user to confirm the specific region or the closest city.

Further, the main controller 20 searches for a simple path associated with overall paths including the source and destination information, and displays the simple path on the display 24 (step S13). Therefore, the vehicle driver can recognize an overall traveling path from Paris, France to Berlin, Germany, for example. Thereafter, if the vehicle moves from the source to another location such that vehicle position information received from the GPS satellite 12 is different from that of the source, the main controller 20 determines that the vehicle is in motion (step S14).

If the vehicle is in motion (as in step S14), the main controller 20 loads map data (e.g., low-scale map data or detailed map data) corresponding to a current vehicle position based on GPS position information from the map data storage unit 16, and displays the loaded map data on the display 24 (step S15). Further, the main controller 20 repeatedly performs the above step S15 when GPS position information (e.g., current latitude and longitude information) received in the GPS receiver is associated with the source country of map data currently displayed on the display 24.

In addition, to determine whether the vehicle is moving to the destination country, the main controller 20 determines whether a current vehicle position received in the GPS receiver 12 is contained in either the map data displayed on the display 24 or map data of the destination country (step S16). Therefore, if the vehicle moves from France to Germany, the main controller 20 loads map data of Germany corresponding to a current vehicle position from the map data storage unit 16, and displays the map data on the display 24 (step S17). In this instance, a new country map data is equal to a map data in which a simple path of the destination country is indicated. In addition, if a predetermined period of time elapses or a user enters a specific key, the main controller 20 searches for a detailed path to Berlin from among the Germany map data, and displays the detailed path on the display 24, such the user is informed of the detailed path at step S18.

Figure 4A:
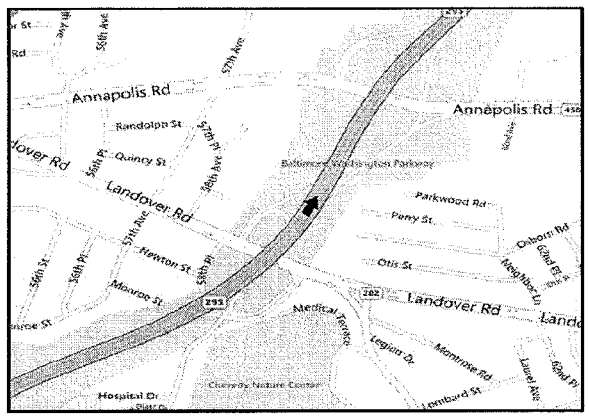
FIGS. 4A-4C are overviews illustrating different maps of a vehicle navigation device in accordance with an embodiment of the present invention.
Figure 4B:
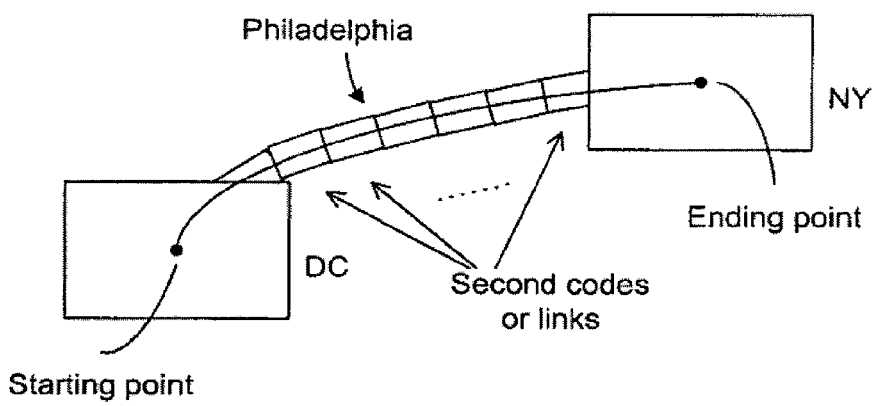
Figure 4C:
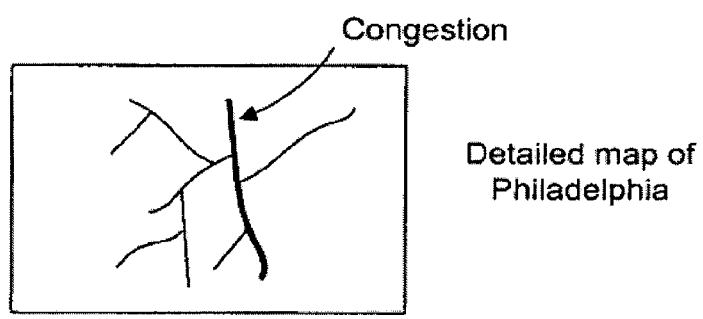
Figure 5:
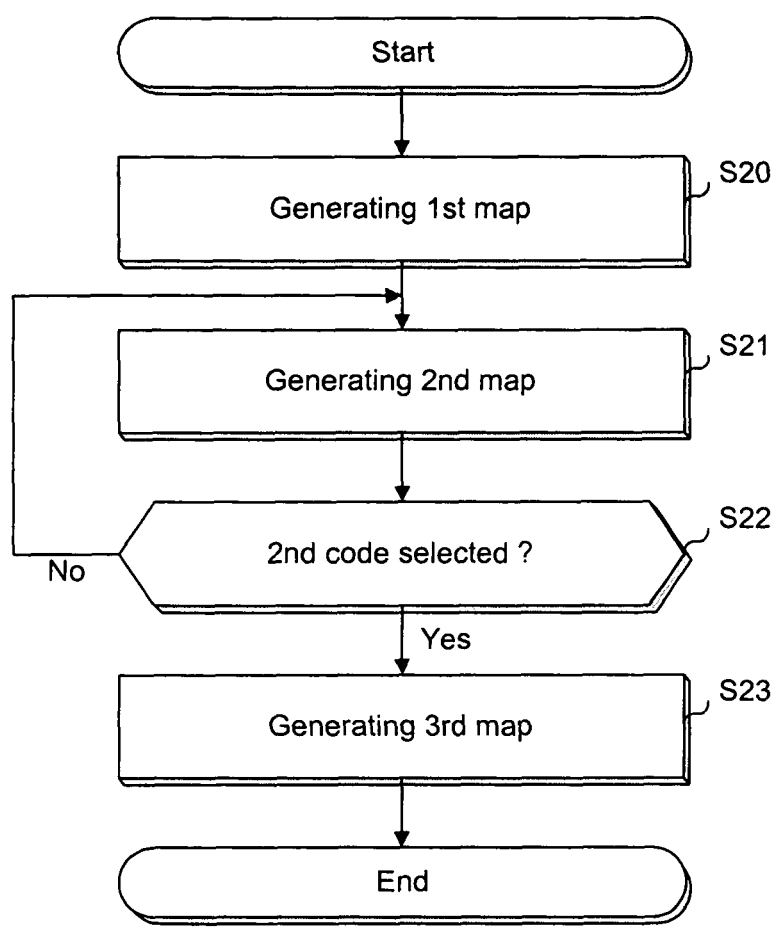
FIG. 5 is a flow chart illustrating a method of displaying maps in accordance with another embodiment of the present invention.
Figure 6:
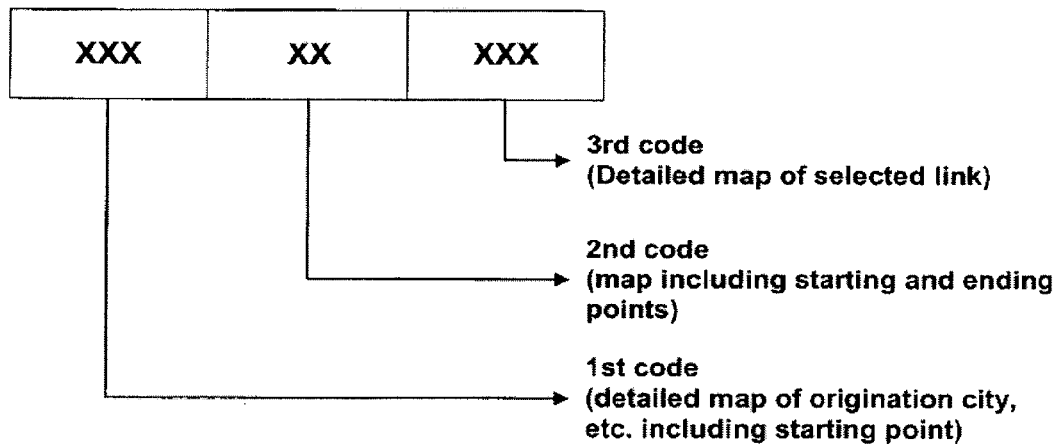
FIG. 6 is an overview illustrating map codes contained in map data in accordance with another embodiment of the present invention.

Turning now to FIGS. 4-6, which illustrate a method of displaying maps in accordance with another embodiment of the present invention. The elements in the apparatus of FIG. 1 will also be used in this description. In more detail, FIGS. 4A-4C respectively illustrate 1) a detailed map of Washington, D.C., 2) a source map of Washington, D.C. and a destination map of New York N.Y., and 3) a detailed map of Philadelphia Pa. This example uses cities, but any other type of regions, countries, etc. may also be used. The displayed maps in FIGS. 4A-4C will now be described in more detail with respect to the flow chart shown in FIG. 5.

As shown in FIG. 5, in accordance with an embodiment of the present invention, the method of generating maps includes generating a first map corresponding to a first code (S20), and generating a second map including a starting point and an ending point with a plurality of second codes representing links from the starting point to the ending point (S21). FIG. 4A illustrates an example of the first map and FIG. 4B illustrates an example of the second map.

In addition, when one of the plurality of second codes is selected, the method generates a third map corresponding to a third code. FIG. 4C illustrates an example of the third map. That is, the third map is a detailed map of the respective selected link. The respective links include names of regions between the starting point and the ending point. For example, the names of regions may be names of cities. Also, the respective links includes roadways or other travel related information between the starting point and the ending point.

Further, as shown in FIG. 6, in this example, the first code is a state code, the second code is a national identification code and the third is a regional sub-group code. In addition, FIGS. 4A and 4B illustrate the first map being a map of a state, and the second map being a map illustrating a starting point in one state and an ending point in another state or country. However, these maps may be of countries or other designated regions.

In addition, with reference to FIGS. 4A-4C, when the user selects a particular link, the user is able to see a detailed map of that particular link (city, etc.). Thus, the user can look ahead of his or her route and determine if there is congestion occurring in the selected link. Looking ahead of his or her route includes selecting the link having the current position of the vehicle or links in front of the link including the current position of the vehicle. Therefore, the user is able to alter their route, if necessary.

Figure 7:
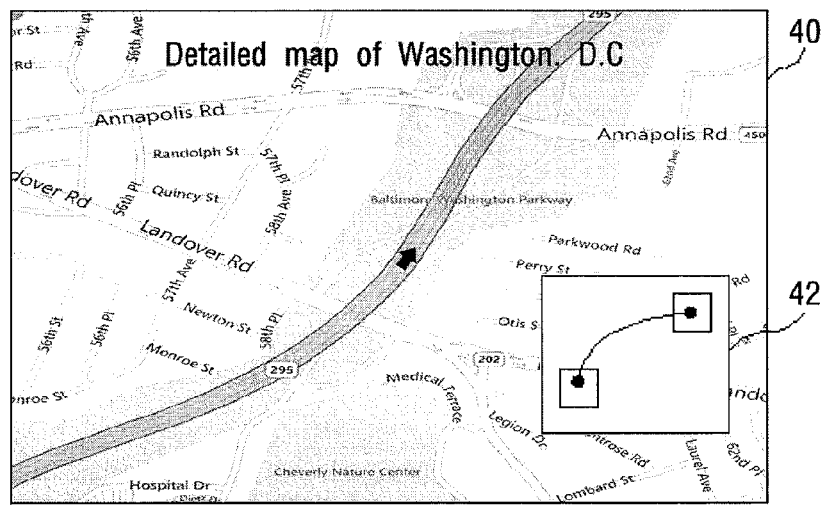
FIG. 7 is an overview of displaying maps in accordance with an embodiment of the present invention.

Further, FIG. 7 illustrates displaying a second map 42 as a smaller map on a first map 40 on the display 24. The first map 40 corresponds to the map shown in FIG. 4A and the second map 42 corresponds to the map shown in FIG. 4B. Thus, the user is able to simultaneously view a detailed map about the current city, state, country, etc. (the vehicle is currently in and also view the source and destination map shown as the smaller map 42). As the user progresses along the route from the source to the destination, the current position of the user will be displayed as the first map 40. That is, when the user is in Philadelphia, the first map 40 will be a detailed view of Philadelphia. Further, the user can select the toggle button 25 on the display 24 or other key to toggle between displaying the first and second maps. That is, the user may desire to only see one of the maps on the display.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method of generating maps in a navigation apparatus, comprising:
   generating a first map corresponding to a first code with a controller of the navigation apparatus;
   displaying the first map on a display of the navigation apparatus; and
   generating a second map including a starting point and an ending point including a plurality of second codes representing a plurality of links from the starting point to the ending point with the controller and displaying the second map on the display, the second map being different than the first map,
   wherein the first code represents a current position a vehicle is located,
   wherein when a particular link among the plurality of links is selected, the method generates a third map corresponding to a third code with the controller and displaying the third map on the display,
   wherein the third map is a detailed map of the selected particular link and includes information detailing traffic congestion conditions in front of the current position of the vehicle which has not been traveled by the vehicle,
   wherein the first map is a map of a first region, and the second map is a map illustrating the starting point in the first region or a second region and the ending point in the first region, the second region or a third region, and
   wherein the first region, the second region and the third region correspond to a first state or country, a second state or country and a third state or country, respectively.

2. The method of claim 1, wherein a respective link among the plurality of links includes names of regions between the starting point and the ending point.

3. The method of claim 2, wherein the names of regions are names of cities.

4. The method of claim 1, wherein a respective link among the plurality of links includes roadways between the starting point and the ending point.

5. The method of claim 1, wherein displaying the second map displays the second map as a smaller map on the first map.

6. The method of claim 5, further comprising:
   toggling between displaying the first and second maps.

7. The method of claim 1, wherein the selected particular link corresponds to a link in front of a link including the current position of the vehicle.

8. The method of claim 1, wherein the third map is different than the first and second maps.

9. A navigation apparatus, comprising:
   a controller configured to generate a first map corresponding to a first code, and to generate a second map including a starting point and an ending point including a plurality of second codes representing a plurality of links from the starting point to the ending point, the second map being different than the first map; and
   a display configured to display the first and second maps,
   wherein the first code represents a current position of a vehicle including the navigation apparatus,
   wherein when a particular link among the plurality of links is selected, the controller generates a third map corresponding to a third code, and the display displays the third map,
   wherein the third map is a detailed map of the respective selected link and includes information detailing congestion traffic conditions in front of the current position of the vehicle which has not been traveled by the vehicle, wherein the first map is a map of a first region, and the second map is a map illustrating the starting point in the first region or a second region and the ending point in the first region, the second region or a third region, and wherein the first region, the second region and the third region correspond to a first state or country, a second state or country and a third state or country, respectively.

10. The apparatus of claim 9, wherein a respective link among the plurality of links includes names of regions between the starting point and the ending point.

11. The apparatus of claim 10, wherein the names of regions are names of cities.

12. The apparatus of claim 9, wherein a respective link among the plurality of links includes roadways between the starting point and the ending point.

13. The apparatus of claim 9, wherein the display displays the second map as a smaller map on the first map.

14. The apparatus of claim 13, further comprising:
a toggle key configured to toggle between displaying the first and second maps.

15. The apparatus of claim 9, wherein the selected particular link corresponds to a link in front of a link including the current position of the vehicle.

16. The apparatus of claim 9, wherein the third map is different than the first and second maps.

* * * * *